United States Patent [19]

Mizrah et al.

[11] Patent Number: 4,912,076
[45] Date of Patent: Mar. 27, 1990

[54] FILTER FOR CLEANING EXHAUST GASES OF DIESEL ENGINES

[75] Inventors: Tiberiu Mizrah; Ludwig Gauckler; Jean-Pierre Gabathuler, all of Schaffhausen, Switzerland

[73] Assignee: Swiss Aluminium Ltd., Chippis, Switzerland

[21] Appl. No.: 252,743

[22] Filed: Oct. 3, 1988

[30] Foreign Application Priority Data

Oct. 15, 1987 [CH] Switzerland .......................... 4051/87

[51] Int. Cl.$^4$ ............................................. B01J 23/00
[52] U.S. Cl. ...................... 502/300; 55/523; 60/311; 502/439; 423/215.5
[58] Field of Search .......................... 55/523, 486, 487; 423/215.5; 60/311; 502/300, 439

[56] References Cited

U.S. PATENT DOCUMENTS

| | | | |
|---|---|---|---|
| 3,963,504 | 6/1976 | Lundsager | 106/41 |
| 4,207,114 | 6/1980 | Schuster et al. | 106/40 |
| 4,264,346 | 4/1981 | Mann | 55/523 |
| 4,451,441 | 5/1984 | Ernest et al. | 55/487 |
| 4,455,395 | 6/1984 | Bussemeier | 518/717 |
| 4,732,594 | 3/1988 | Mizrah et al. | 55/523 |
| 4,759,918 | 7/1988 | Homeier et al. | 55/523 |

FOREIGN PATENT DOCUMENTS

| | | |
|---|---|---|
| 0050340 | 4/1982 | European Pat. Off. |
| 0126847 | 12/1984 | European Pat. Off. |
| 0216729 | 1/1987 | European Pat. Off. |
| 0223959 | 6/1987 | European Pat. Off. |
| 3407172 | 9/1985 | Fed. Rep. of Germany |
| 3527872 | 2/1986 | Fed. Rep. of Germany |
| 8620832 | 6/1987 | Fed. Rep. of Germany |
| 57223 | 3/1986 | Japan .................... 55/523 |

*Primary Examiner*—Bernard Nozick
*Attorney, Agent, or Firm*—Bachman & LaPointe

[57] ABSTRACT

In the case of filters for cleaning the exhaust gases of diesel engines, the deposited soot particles are burnt at intervals at temperatures between 550° to 700° C. By using filters consisting of open-pore ceramic foam manufactured by coating an open-pore body which can be burnt out, with a ceramic powder suspension, burning out the substrate material at temperatures of 100°–500° C. and then sintering at elevated temperatures, which filters comprise a self-supporting ceramic structure with an internal surface area of the total pore system of 1 $m^2/l$ to 10 $m^2/l$ and an open porosity of 55–92%, the soot combustion temperature is reduced to between 400° to 550° C. When coated with catalytically active substances, the soot combustion temperature is even reduced to 350° C.

10 Claims, No Drawings

FILTER FOR CLEANING EXHAUST GASES OF DIESEL ENGINES

The present invention relates to a filter for cleaning exhaust gases of diesel engines with open-pore ceramic foam, manufactured by coating an open-pore body capable of being burnt out, with a ceramic powder suspension, burning out the substrate material at temperatures of 100°–500° C. and then sintering at elevated temperatures.

The soot components of exhaust gases of diesel engines can basically be reduced in two ways: by optimizing mixture preparation and the process of combustion in the engine, and by fitting filters in the exhaust stream. Depending on the design of the filter, usually degrees of soot precipitation of 50–90% are obtained.

As the diesel exhaust soot filter would be blocked with soot within a short time of use, the soot must be burnt periodically. The interval from one regeneration stage to the next is referred to as the regeneration interval. Under certain conditions the filter regenerates itself. Soot deposits are burnt at temperatures between 550° and 700° C. With catalytically coated filters, the combustion temperature can be reduced to about 500° C.

From U.S. Pat. No. 4,264,346 is known the technique of using an open-pore ceramic foam as an active filter medium for the above purposes. In this case an open-pore ceramic foam is taken to a mean porous ceramic body with a three-dimensional network and cellular structure which contains a plurality of continuous cavities. The ceramic body, which is usually cylindrical or consists of several lamellae, is placed in the exhaust stream of diesel engines in such a way that the exhaust gases impinges on its end face and flow through it parallel to its axis or positively. In this case soot precipitation is greatest in the filter portion through which the gases flow initially, and rapidly decreases with increasing throughflow. The result of this is that in the region which is first approached the filter reaches its capacity for absorption of soot deposits after a relatively short time and has to be regenerated, while the remainder of the filter is still capable of taking soot, but is already likewise subjected to the regeneration process.

Although the dust deposit absorption capacity of the ceramic filter can be improved, no consideration has been given to the problem of reducing the combustion temperature of the deposited soot, in order to induce the generation stage as early as possible.

The inventors therefore set themselves the object of lowering the combustion temperature in filters with open-pore ceramic foam for cleaning exhaust gases of diesel engines.

According to the invention, the set object is achieved by a filter for cleaning exhaust gases of diesel engines with an open-pore ceramic foam, manufactured by coating an open-pore body which can be burnt out, with a ceramic powder suspension, burning out the substrate material at temperatures from 100° to 500° C., and then sintering at elevated temperatures, characterized in that the filter comprises a self-supporting ceramic structure with an internal surface area of the total pore system of 1 $m^2/1$ to 10 $m^2/1$ and an open porosity of 55 to 92%. Advantageous developments of the subject according to the invention include the substrate material being a porous material, in particular in the form of a foam, fleece and woven material or wherein the substrate material is a polyurethane foam with a nominal fineness of 30–80 pores per 2.54 cm linear length. The ceramic powder suspension may contain substances or, as a result of subsequent temperature treatment form substances which catalytically promote regeneration of the filter during cleaning of exhaust gases. The filter may contain one or more ceramic foam bodies in the form of planar sheets or solid cylinders, in particular with a circular cross-section, wherein if several ceramic foam bodies are used, the exhaust gases to be cleaned flow through the bodies successively and/or simultaneously. The filter may provide that the ceramic foam is constructed as a hollow cylinder optionally closed at one end and the exhaust gases to be cleaned flow through the ceramic foam essentially radially to the cylinder axis. The length of flow of the exhaust gases through a ceramic element may be between 3 and 15 cm. In addition, in the filter the total volume of the ceramic foam may approximately correspond to the cubic capacity of the diesel whose exhaust gases are cleaned. In addition, in the filter the exhaust gases to be cleaned may flow first through larger pores then through finer pores of the ceramic foam, wherein a ceramic foam element comprises larger and finer pore layers or two or more ceramic foam elements of different pore size arranged one behind the other. In addition, the total pore system may be coated with a catalytically active substance.

By means of the filter according to the invention, it was possible to obtain particularly low soot combustion temperatures in the cleaning of exhaust gases of diesel engines during the regeneration stage. Without using catalytically active substances in manufacture of the ceramic foam, soot combustion temperatures between 400° and 550° C. are measured, the lowest temperatures being measured when using hollow cylindrical ceramic foam bodies through which the exhaust gas to be cleaned flows radially outwards. With catalytically active substances, these temperatures could be reduced even to 300° to 400° C.

The number of pores of the bodies varied between 30 and 80 per 2.54 cm linear length. The bodies were made of cordierite, lithium aluminosilicate or mullite, or partly even mixtures thereof. The use of silicon carbide or some other ceramic composition which is thermally shock-resistant and has high strength was also suitable for manufacture of the ceramic foam.

It turned out that the ceramic compositions had no essential effect on soot ignition temperatures. Essential to the invention, on the other hand, is the preparation of a pore system with an internal surface area of between 1 $m^2/1$ and 10 $m^2/1$. This surface area is obtained in particular due to the fact that the ceramic slip which completely covers the surface of the organic substrate material acquires cracks or pores due to stresses when it begins to dry and/or during or after burning out of the organic substrate material, whereby the final sintered ceramic foam comprises webs with openings. The openings form the access to a second surface area system, so that the total surface area of the pore system is considerably greater than the replica surface area of a ceramic foam body with the same web configuration which is used according to the state of the art for exhaust cleaning purposes of the kind according to the invention, with the result that in addition to other phenomena not yet clarified physically and chemically in detail, the progress of the flame through the ceramic foam according to the invention during regeneration is substantially faster.

In the region of the openings, the surfaces of the webs of the ceramic foam are not smooth, as is usual in the state of the art, but the edges of the openings are mainly arched at an angle to the directions of the web axes. The arches portions on the one hand have the effect that solid particles from the exhaust stream adhere to them preferentially and thus lead to isolated local blockages of the ceramic foam system. The blockages act as local hot spots and cause premature ignition of the retained solid particles.

The dual surface system allows complete burning of solid particles, which consist almost entirely of soot and volatile hydrocarbons. Almost complete filter regeneration is obtained at temperatures from about 400° C., as a result of which one of the main problems in practical operation of filter systems for cleaning exhaust gases of diesel engines is overcome.

With diesel engines of cars, lorries or stationary plant, degrees of filtration of 30-90% could be obtained with the filter according to the invention. The pressure loss as the difference in pressure upstream and downstream of the filter according to the invention was 20-300 mbar during running of the engines, or 9-60 mbar in the case of a cold, soot-free air mass flow corresponding to the air mass flow during running of the engines.

The two different surfaces furthermore have the great advantage, if they are both coated with a catalytically active substance, that there is long-term stability of catalytic action. The latter is substantially higher than in the case of ceramics with honeycomb structure or metal wool used for the same purpose.

Such catalytic coatings are known in the art (U.S. Pat. No. 4,455,395 or West German patent No. 3 407 172) and are used in addition in the filter according to the invention to reduce the regeneration temperature. Depending on the type of use, the catalytically active coating can be applied both directly to the ceramic foam body and to a previously applied coating, generally referred to as a wash coat.

We claim:

1. Filter for cleaning exhaust gases of diesel engines with an open-pore ceramic foam, manufactured by coating an open-pore body which can be burnt out, with a ceramic powder suspension, burning out the substrate material at temperatures from 100° to 500° C., and then sintering at elevated temperatures, wherein the filter comprises a self-supporting ceramic structure with an internal surface area of the pores between 1 meter$^2$/liter to 10 meter$^2$/liter and an open porosity of 55 to 92%, said ceramic structure comprising webs with openings, wherein the edges of the openings are arched so that solid particles preferentially adhere thereto, and wherein the internal surface area of the pores is coated with a catalytically active substance, whereby soot combustion temperature is reduced.

2. Filter according to claim 1 wherein the ceramic powder suspension contains substances which catalytically promote regeneration of the filter during cleaning of exhaust gases.

3. Filter according to claim 1 wherein as a result of temperature treatment, the ceramic powder suspension forms substances which catalytically promote regeneration of the filter during cleaning of exhaust gases.

4. Filter according to claim 1 wherein the self-supporting ceramic structure comprises at least one ceramic foam body consisting of planar sheets.

5. Filter according to claim 1 wherein the substrate material is a porous organic material.

6. Filter according to claim 5 wherein the substrate material is a polyurethane foam with nominal fineness of 30-80 pores per 2.54 cm linear length.

7. Filter according to claim 1 wherein the self-supporting ceramic structure comprises at least one ceramic foam body consisting of a solid cylinder.

8. Filter according to claim 7 wherein the length of the ceramic foam body through which the exhaust gases pass is between 3 and 15 cm.

9. Filter according to claim 1 wherein the ceramic foam is constructed as a hollow cylinder and the exhaust gases to be cleaned flow through the ceramic foam essentially radially to the cylinder axis.

10. Filter according to claim 9 wherein said hollow cylinder is closed at one end.

* * * * *